United States Patent Office 3,413,292
Patented Nov. 26, 1968

3,413,292
PROCESS FOR MAKING TERTIARY AMINO KETONES FROM THE CORRESPONDING ALCOHOLS
Fred L. Johnson, Jr., and George P. Speranza, Austin, Tex., assignors to Jefferson Chemical Company, Inc., a corporation of Delaware
No Drawing. Filed Dec. 27, 1965, Ser. No. 516,734
6 Claims. (Cl. 260—247.7)

ABSTRACT OF THE DISCLOSURE

Amino ketones can be produced from the corresponding secondary alcohol by contacting the alcohol in the vapor phase with a copper-containing catalyst. The secondary alcohol feedstock is represented by the formula

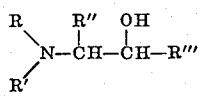

where R, R' and R''' each is an organic group and R'' is hydrogen or an organic group, the organic groups being alkyl, aromatic or heterocyclic groups having 1 to 18 carbon atoms.

---

This invention is directed to a method for the production of amino ketones. More particularly, this invention is directed to a new method for the catalytic synthesis of amino ketones from amine alcohols.

In accordance with the present invention, compounds of the general formula RR'NCHR''CHOHR''' are converted to compounds of the formula RR'NCHR''COR''' by catalytically contacting a feed compound in vapor phase with a reduced copper catalyst. In the above formulae, R, R' and R''' are organic groups containing 1 to 18 carbon atoms such as methyl, ethyl, propyl, isopropyl, butyl, phenyl, morpholino, anilino, dodecyl, dodecyl phenyl, etc. R'' is either organic group as above defined or hydrogen. Representative examples of suitable feedstocks which may be used in accordance with the present invention are 2-hydroxypropyl-N-methylaniline, 1-diethylamino-2-hydroxypropane, 2-hydroxypropylmorpholine, 2-hydroxybutylmorpholine, etc.

The catalyst to be used in accordance with the present invention is a copper catalyst such as a prereduced copper-chrome catalyst containing about 2 to about 75 wt. percent of chrome; for instance a copper-chrome-zinc catalyst containing from about 2 to about 25 wt. percent of chrome and about 93 to about 25 wt. percent of zinc (as oxides). As another example, a catalyst may be prepared by hydrogen reduction of a mixture containing 5 to 50 wt. percent of copper oxide and 2 to 25 wt. percent of chromium oxide with, correspondingly, 93 to 25 wt. percent of the zinc oxide.

The reduction, accomplished in the presence of hydrogen, may be conducted at a temperature within the range of 300° to 500° C. by passing a stream of a hydrogen-containing gas such as a mixture of 2 to 10 mol percent of hydrogen with, correspondingly, 98 to 90 mol percent of nitrogen over the catalyst for a period of time within the range of 2 to 24 hours sufficient to substantially reduce the copper oxide to metallic copper. Under these conditions, the more difficultly reducible chromium oxide will remain in the oxide form.

When tertiary amino alcohols, in which the nitrogen can be part of an aliphatic, aromatic or heterocyclic system, are passed over a reduced copper catalyst at a temperature within the range of about 250° to about 400° C. in vapor phase at a flow rate of about 0.5 to about 1 pound of feed per pound of catalyst per hour, dehydrogenation of the hydroxyl group occurs with the formation of a ketone corresponding to the original alcohol. For this synthesis, the hydroxyl group should be beta to the nitrogen. Thus, a wide variety of feedstocks may be employed.

In the following specific examples, the catalyst that was used was prepared from a mixture of 11 wt. percent copper oxide, 22 wt. percent chromia and 60 wt. percent zinc oxide. The catalyst was pelleted and reduced with a stream of 4 percent hydrogen and nitrogen for 20 hours at 380° to 400° C.

The invention will be further illustrated with respect to the following specific examples which are given by way of illustration and not as limitation on the scope of this invention. Where parts are given, they are parts by weight.

Example I

The copper-zinc chrome catalyst was reduced with 4% hydrogen in nitrogen for 20 hours at 380° to 400° C. After reduction, 2-hydroxypropylmorpholine, preheated so as to vaporize the liquid, was passed over the catalyst at a rate of about one gram per cc. catalyst per hour. The catalyst temperature varied from about 300° to 350° C. Analysis by vapor phase chromatography indicated that morpholino-acetone (morpholino-propanone-2) was produced in 93% yield with 75% conversion of feed.

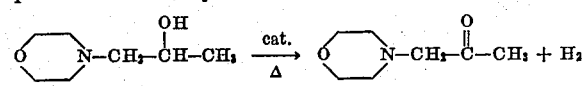

Example II

In a manner similar to that described in Example I, 2-hydroxybutylmorpholine was converted to morpholino-butanone-2 in 97% yield with 53% conversion of feed.

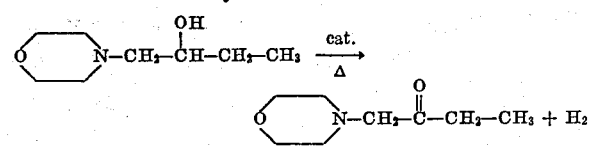

Example III

In a manner similar to that described in Example I, N-methylanilino-propanol-2 was converted to N-methylanilino-propanone-2 in 83% yield with 93% conversion of feed.

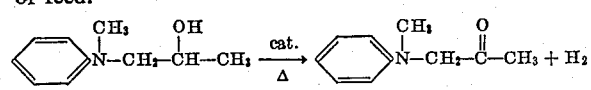

Example IV

In a manner similar to that described in Example I, diethylaminopropanol-2 was converted to diethylaminopropanone-2 in 86% yield with 91% conversion of feed.

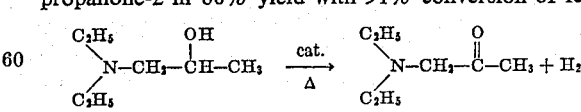

What is claimed is:
1. A method for the production of an amino ketone represented by the formula RR'NCHR''COR''' which comprises contacting a tertiary amino alcohol represented by the formula RR'NCHR''CHOHR''' with a copper-containing catalyst in vapor phase at a temperature within the range of about 250° to about 400° C., wherein R, R' and R''' each is an organic group and R'' is hydrogen or an organic group, said organic groups having from about 1 to about 18 carbon atoms and being selected from alkyl, aromatic or heterocyclic groups wherein the catalyst is obtained by the hydrogen reduction of a mixture of 5 to about 50 wt. percent of copper, about 2 to about 25 wt. percent of chrome and about 93 to about 25 wt. percent of zinc, all as oxides.

2. A method as in claim 1 wherein the feed compound is 2-hydroxypropylmorpholine and the product is morpholino-propanone-2.

3. A method as in claim 1 wherein the feed compound is N-methylanilinopropanol-2 and the product is N-methylanilinopropanone-2.

4. A method as in claim 1 wherein the feedstock is diethylaminopropanol-2 and the product is diethylaminopropanone-2.

5. A method as in claim 1 wherein the feedstock is 2-hydroxybutylmorpholine and the product is morpholinobutanone-2.

6. The method of claim 1 wherein the tertiary amino alcohol is selected from 2-hydroxypropyl-N-methylaniline, 1-diethylamino-2-hydroxypropane, 2-hydroxypropylmorpholine and 2-hydroxybutylmorpholine.

No references cited.

NICHOLAS S. RIZZO, *Primary Examiner.*

JOSE TOVAR, *Assistant Examiner.*